(12) United States Patent
Momii et al.

(10) Patent No.: US 12,545,336 B2
(45) Date of Patent: Feb. 10, 2026

(54) MOVABLE SPOILER DEVICE

(71) Applicant: Honda Motor Co., Ltd., Tokyo (JP)

(72) Inventors: Motoyuki Momii, Tokyo (JP); Kei Ambo, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 396 days.

(21) Appl. No.: 18/358,956

(22) Filed: Jul. 26, 2023

(65) Prior Publication Data

US 2024/0109609 A1 Apr. 4, 2024

(30) Foreign Application Priority Data

Sep. 29, 2022 (CN) .......................... 202211198155.1

(51) Int. Cl.
*B62D 35/00* (2006.01)
(52) U.S. Cl.
CPC .................. *B62D 35/007* (2013.01)
(58) Field of Classification Search
CPC ...... Y02T 10/82; B62D 37/02; B62D 35/007; B62D 35/00
See application file for complete search history.

(56) References Cited

U.S. PATENT DOCUMENTS

| | | | |
|---|---|---|---|
| 2004/0113457 A1* | 6/2004 | JaCquemard | B62D 35/005 |
| | | | 296/180.1 |
| 2015/0166130 A1 | 6/2015 | Lee et al. | |
| 2016/0318560 A1* | 11/2016 | Kishima | B60Q 1/0035 |
| 2018/0009402 A1* | 1/2018 | Cha | B60R 19/023 |
| 2018/0134329 A1* | 5/2018 | Cha | B62D 37/02 |
| 2018/0134330 A1* | 5/2018 | Cha | B62D 37/02 |
| 2018/0134332 A1* | 5/2018 | Cha | B62D 35/007 |
| 2019/0002039 A1* | 1/2019 | Cha | G01S 19/42 |

FOREIGN PATENT DOCUMENTS

| | | | |
|---|---|---|---|
| JP | 2000108818 A | * | 4/2000 |
| JP | 2005350005 A | * | 12/2005 |
| KR | 101526735 B1 | * | 6/2015 |

* cited by examiner

*Primary Examiner* — Lori Lyjak
(74) *Attorney, Agent, or Firm* — JCIPRNET

(57) ABSTRACT

A movable spoiler device is provided in the disclosure. The movable spoiler device includes: a fixed part, fixed on a body of a vehicle; a movable part, configured to be movable between a storage position connected to the fixed part and a deployed position protruding from the fixed part toward rear of the vehicle; an actuator, disposed on the fixed part and drives the movable part to move in a front-rear direction of the vehicle; and a cover member, disposed on the fixed part and connected to the movable part so as to be linked with the movable part, in which there is a gap between the movable part and the fixed part due to the movement of the movable part, when the movable part moves from the storage position to the deployed position, the cover member is driven by the movable part to move and cover the gap.

19 Claims, 7 Drawing Sheets

MOVABLE SPOILER DEVICE

CROSS-REFERENCE TO RELATED APPLICATION

This application claims the priority benefit of China application serial no. 202211198155.1 filed on Sep. 29, 2022. The entirety of the above-mentioned patent application is hereby incorporated by reference herein and made a part of this specification.

BACKGROUND

Technical Field

The disclosure relates a movable spoiler mechanism.

Description of Related Art

In recent years, due to concerns about global warming, in order to ensure affordable, reliable, sustainable, and advanced energy access for more people, research and development on fuel efficiency improvement that contributes to energy efficiency is underway. However, the aerodynamic performance of the vehicle is an issue in the present technology regarding improvement of fuel efficiency.

In the prior art, generally, a spoiler device may be disposed at the rear end of the body of the vehicle (such as the rear bumper) to improve the aerodynamic performance of the vehicle. A common spoiler device may be a fixed spoiler with a specific shape. At present, there is also a movable spoiler device formed of a fixed part and a movable part. The movable part may move relative to the fixed part in a front-rear direction of the vehicle to change its position, thereby adjusting the aerodynamic performance. However, during the movement of the movable part in the front-rear direction of the vehicle relative to the fixed part by the drive of the link mechanism, there is a gap between the movable part and the fixed part due to the movement of the movable part, leading to concerns about foreign matter intrusion or reduced aerodynamic performance. Therefore, it is necessary to improve the above structure of the movable spoiler device.

In order to solve the above-mentioned problems, the disclosure aims to achieve a movable spoiler device capable of preventing the intrusion of foreign matter and improve the aerodynamic performance. Furthermore, it in turn contributes to energy efficiency by operating the aerodynamic device.

SUMMARY

A movable spoiler device, which may prevent the intrusion of foreign matter and improve the aerodynamic performance, is provided in the disclosure.

A movable spoiler device is provided, including: a fixed part, fixed on a body of a vehicle; a movable part, configured to be movable between a storage position connected to the fixed part and a deployed position protruding from the fixed part toward rear of the vehicle; an actuator, disposed on the fixed part and drives the movable part to move in a front-rear direction of the vehicle; and a cover member, disposed on the fixed part and connected to the movable part so as to be linked with the movable part, in which there is a gap between the movable part and the fixed part due to the movement of the movable part, when the movable part moves from the storage position to the deployed position, the cover member is driven by the movable part to move and cover the gap.

Based on the above, in the movable spoiler device of the disclosure, the cover member is disposed on the fixed part, and is connected to the movable part so as to be linked with the movable part. There is a gap between the movable part and the fixed part due to the movement of the movable part, when the movable part moves from the storage position to the deployed position, the cover member is driven by the movable part to move and cover the gap. In this way, even if there is a gap due to the movement of the movable part while the movable part is moving in the front-rear direction of the vehicle relative to the fixed part through the drive of the actuator, the gap may be adaptively covered by the cover member during the movement, thereby preventing the gap from being exposed throughout the movement of the movable part. Accordingly, the movable spoiler device of the disclosure may prevent the intrusion of foreign matter and improve the aerodynamic performance.

In order to make the above-mentioned features and advantages of the disclosure comprehensible, embodiments accompanied with drawings are described in detail below.

DETAILED DESCRIPTION OF DISCLOSED EMBODIMENTS

Figure 1A:
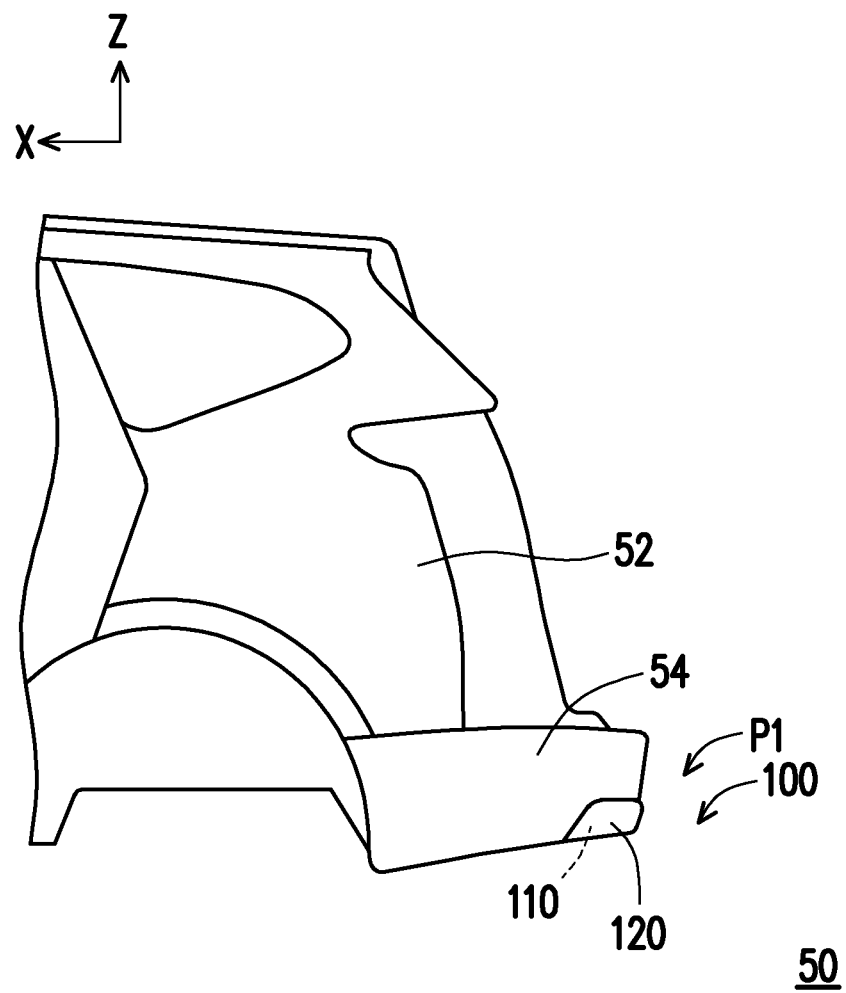
FIG. 1A and FIG. 1B are schematic diagrams of a movable spoiler device in an embodiment of the disclosure applied on a vehicle and is located in a storage position and a deployed position.
Figure 1B:
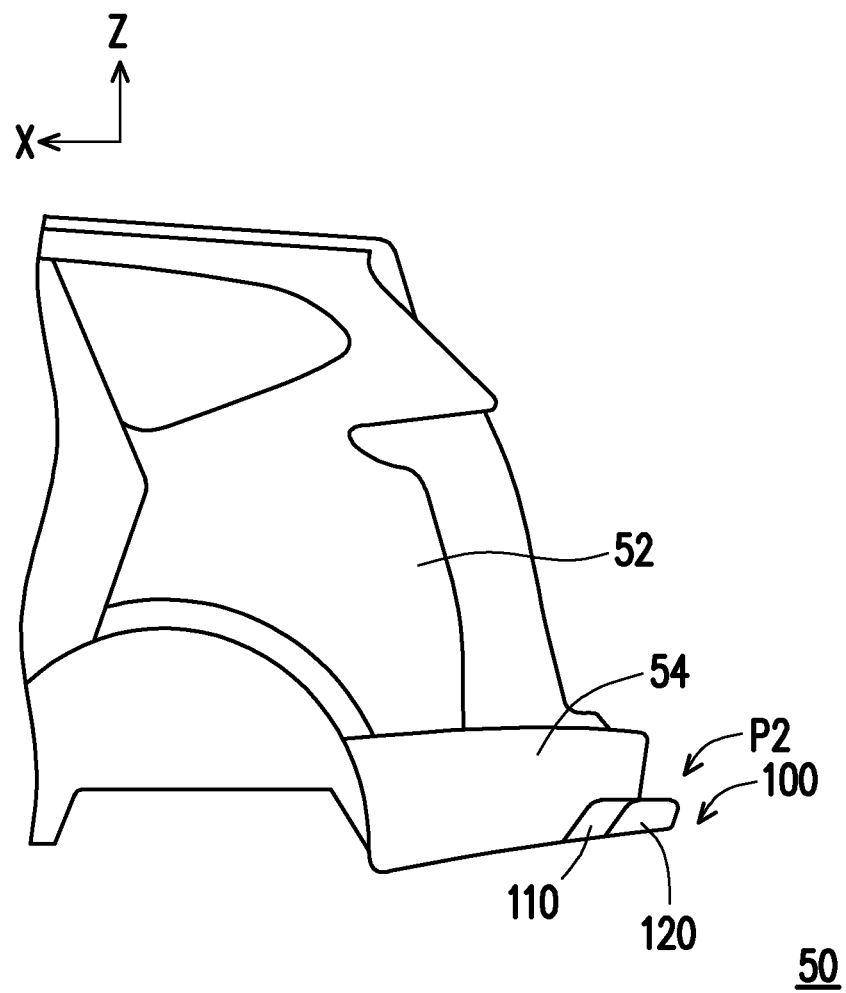
Figure 2A:
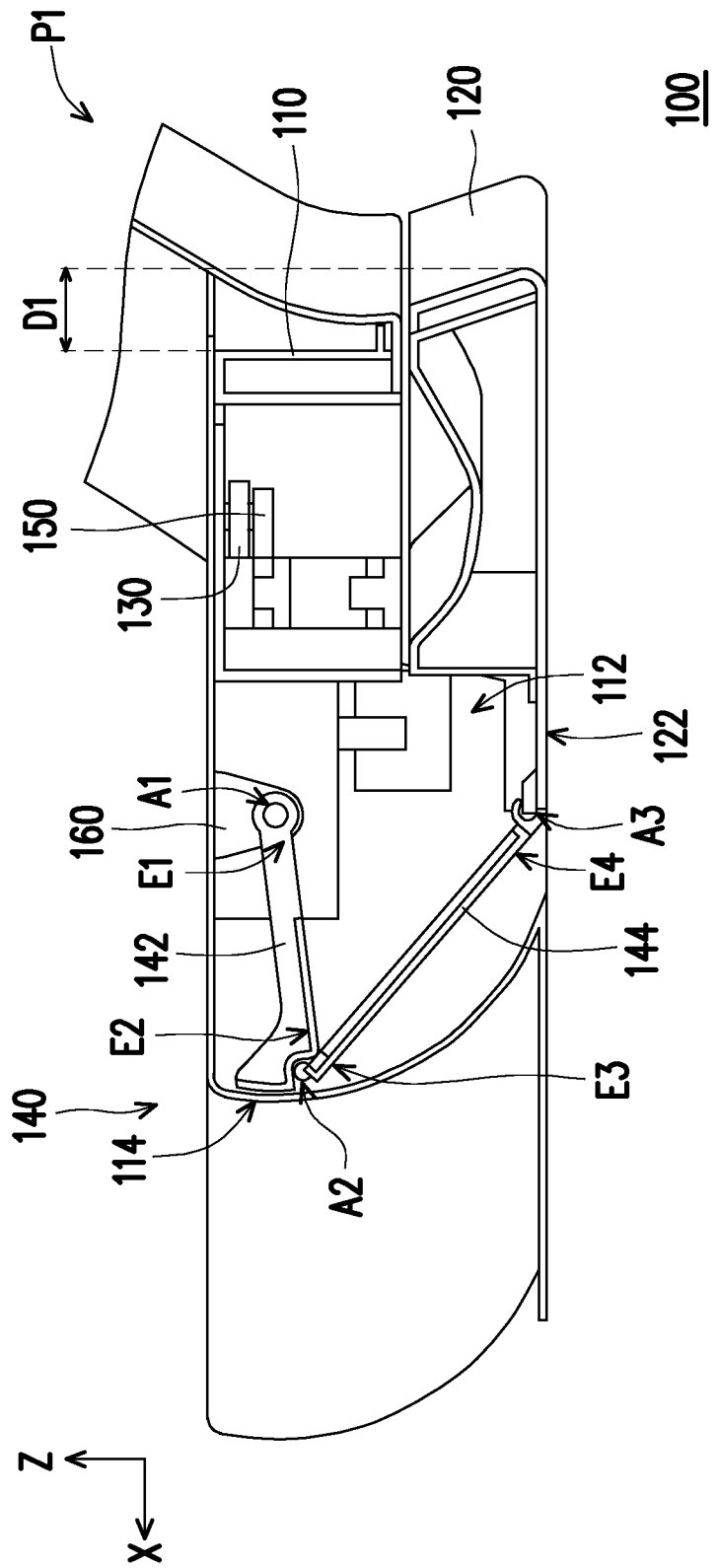
FIG. 2A and FIG. 2B are partial side schematic diagrams of the movable spoiler device shown in FIG. 1A and FIG. 1B at the storage position and the deployed position.
Figure 2B:
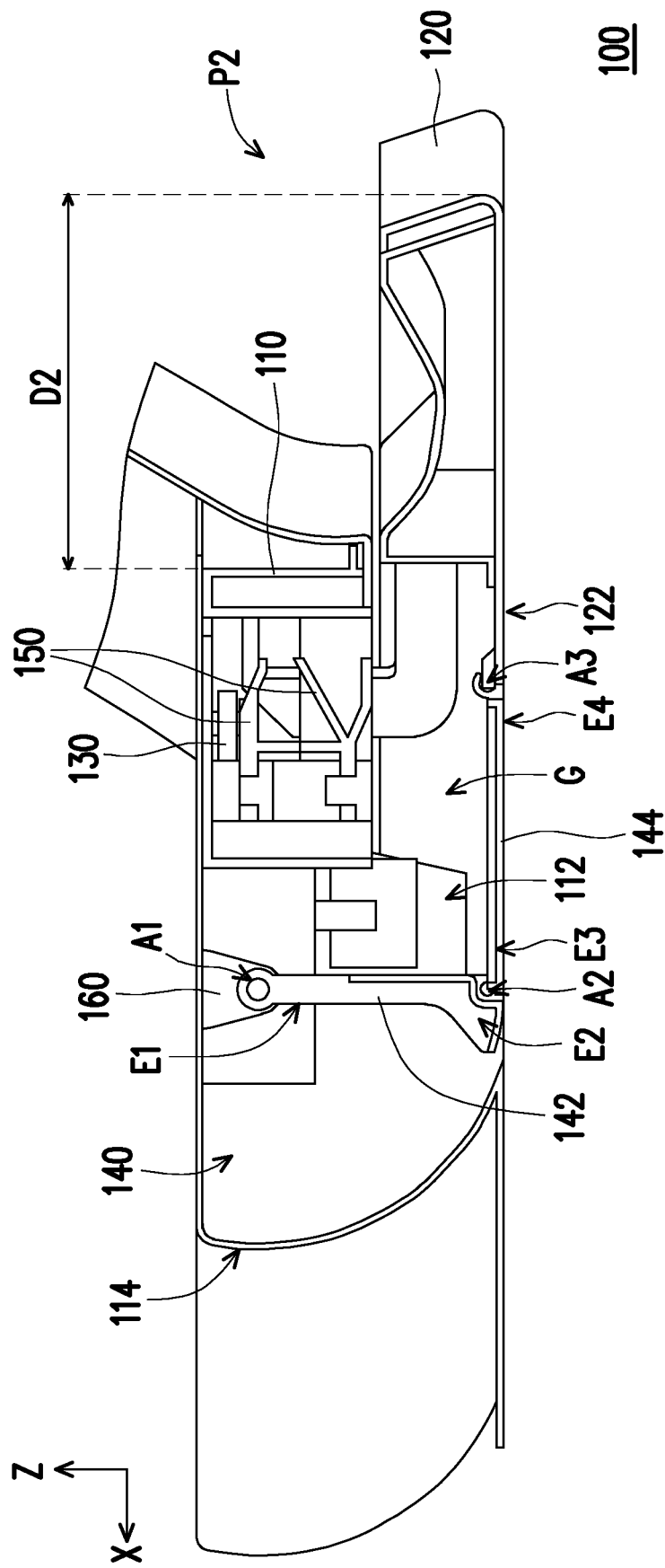
Figure 3A:
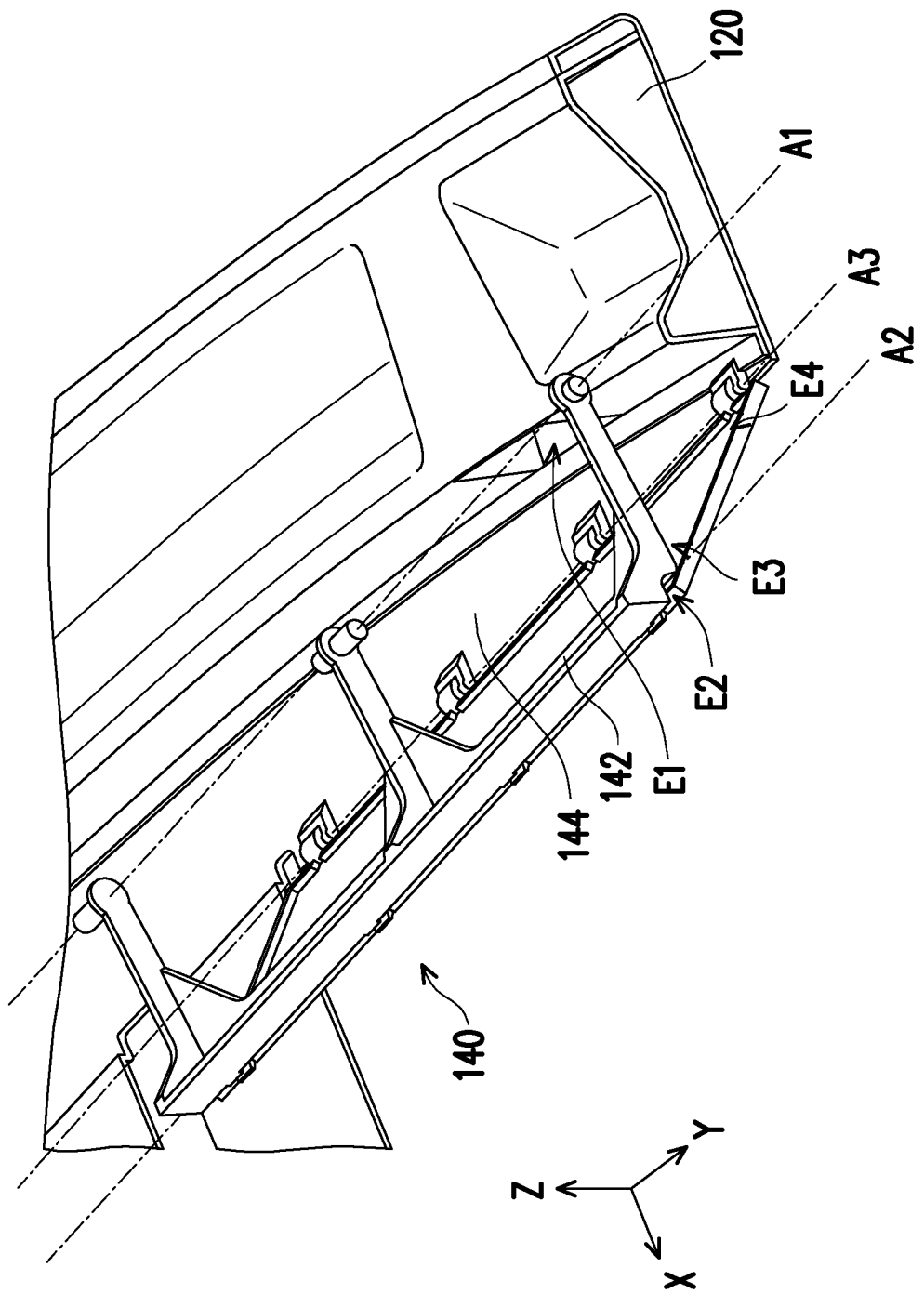
FIG. 3A and FIG. 3B are partial appearance schematic diagrams of the movable part and the cover member used in the movable spoiler device shown in FIG. 2A and FIG. 2B at the storage position and the deployed position.
Figure 3B:
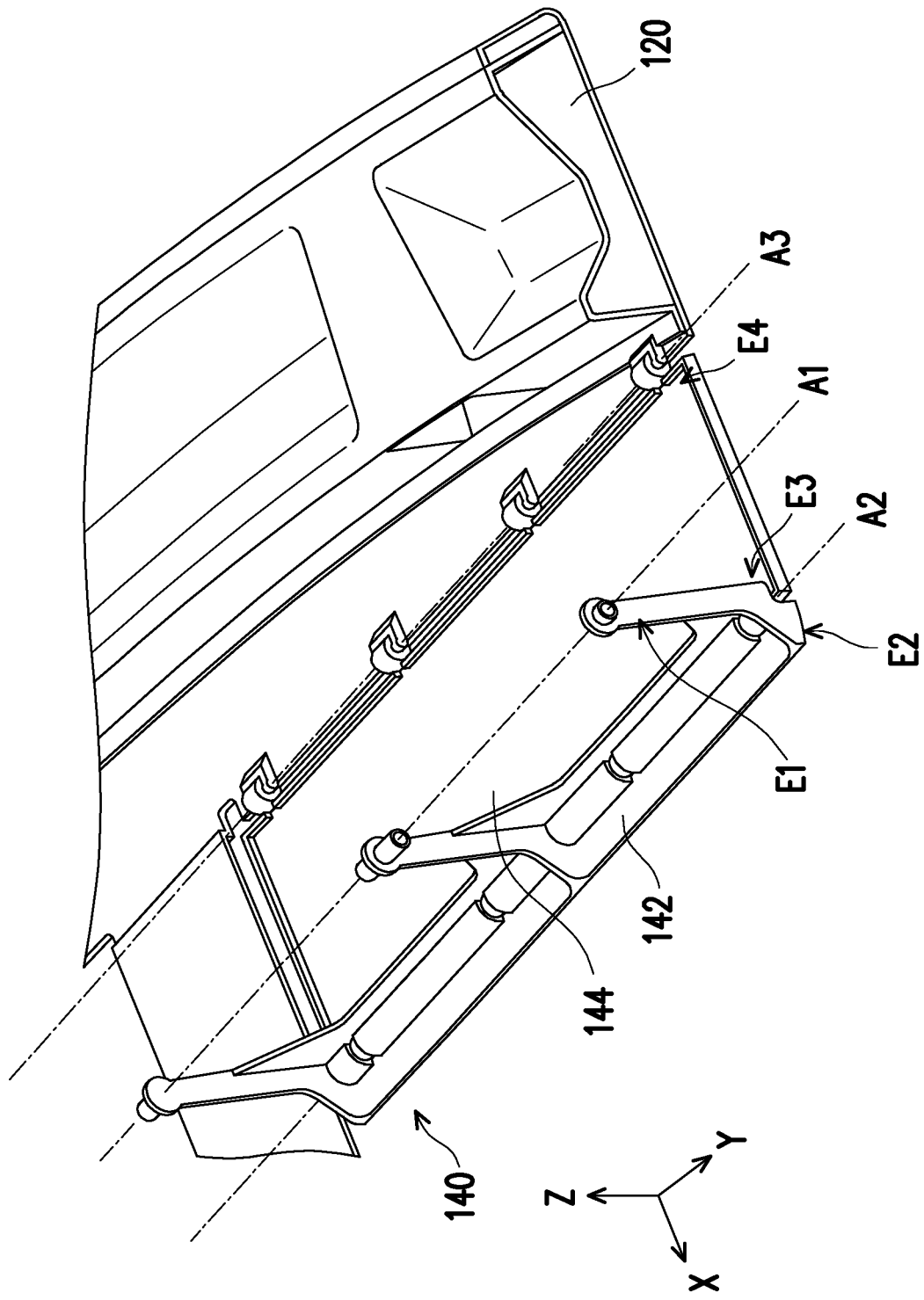
Figure 4:
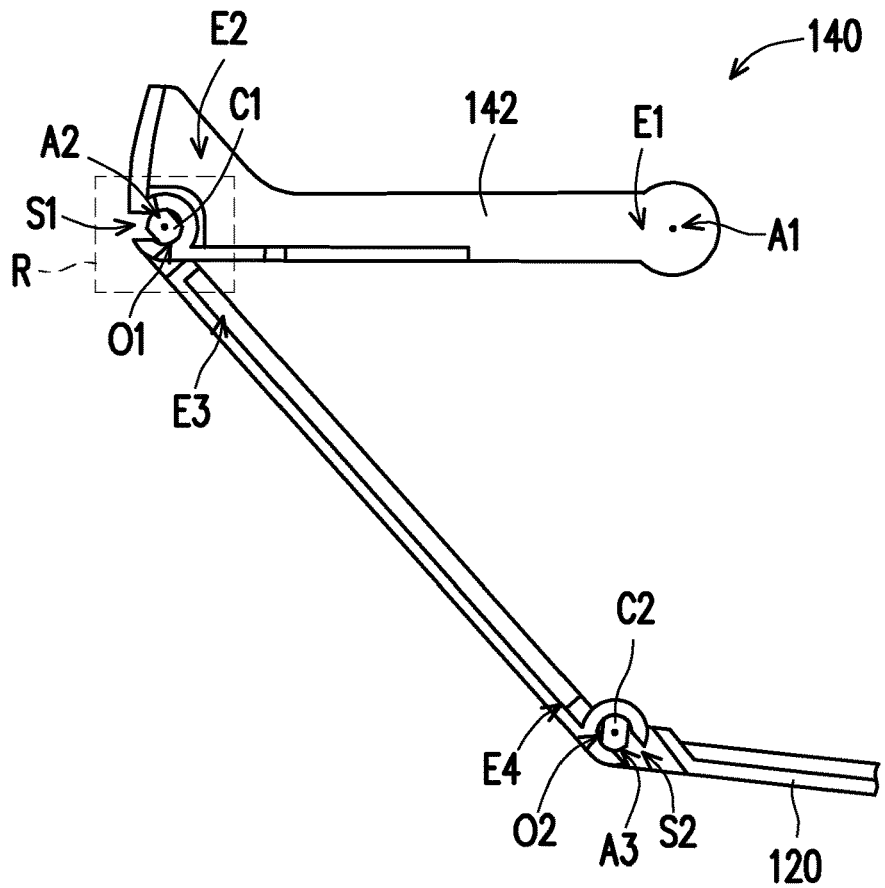
FIG. 4 is a side schematic diagram of the cover member used in the movable spoiler device shown in FIG. 2A during the movement.
Figure 5:
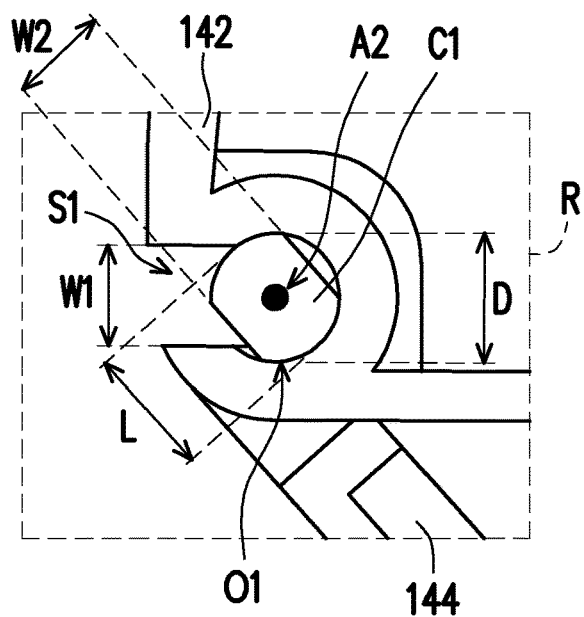
FIG. 5 is a partially enlarged schematic diagram of the cover member shown in FIG. 4 in the region R.

References of the exemplary embodiments of the disclosure are to be made in detail. Examples of the exemplary embodiments are illustrated in the drawings. FIG. 1A and FIG. 1B are schematic diagrams of a movable spoiler device in an embodiment of the disclosure applied on a vehicle and is located in a storage position and a deployed position. FIG. 2A and FIG. 2B are partial side schematic diagrams of the movable spoiler device shown in FIG. 1A and FIG. 1B at the storage position and the deployed position. FIG. 3A and FIG. 3B are partial appearance schematic diagrams of the movable part and the cover member used in the movable spoiler device shown in FIG. 2A and FIG. 2B at the storage position and the deployed position. FIG. 4 is a side schematic diagram of the cover member used in the movable spoiler device shown in FIG. 2A during the movement. FIG. 5 is a partially enlarged schematic diagram of the cover member shown in FIG. 4 in the region R. The application and specific structure of the movable spoiler device 100 of this embodiment is described below with reference to FIG. 1A to FIG. 5. The front-rear direction of the vehicle described later refers to, for example, the front-rear direction X in the accompanying drawings, and the direction indicated by the arrow is the front. The left-right direction of the vehicle refers to, for example, the left-right direction Y in the accompanying drawings, and the direction indicated by the arrow is the left. The up-down direction serving as the first direction of the vehicle refers to, for example, the up-down direction Z in the accompanying drawings, and the direction indicated by the arrow is upward. This is only one example of the disclosure, and the disclosure is not limited thereto.

In an embodiment of the disclosure, the cover member includes a first member and a second member, the first member is rotatably connected to the fixed part with a first axis extending in a left-right direction of the vehicle, the second member is rotatably connected to the first member with a second axis extending in the left-right direction of the vehicle, and is rotatably connected to a lower surface of the movable part with a third axis extending in the left-right direction.

In an embodiment of the disclosure, when the movable part is located at the storage position, the first member and the second member are stored at an inner side of the fixed part, and when the movable part is located at the deployed position, the second member covers the gap.

In an embodiment of the disclosure, the second member covering the gap in the deployed position is coplanar with the movable part.

In an embodiment of the disclosure, the first member includes a first end and a second end, the first end is connected to the fixed part in a rotatable manner about the first axis, and the second end is connected to the second member in a rotatable manner about the second axis.

In an embodiment of the disclosure, the second member includes a third end and a fourth end, the third end is connected to the second end of the first member in a rotatable manner about the second axis, and the fourth end is connected to the lower surface of the movable part in a rotatable manner about the third axis.

In an embodiment of the disclosure, when the movable part is located at the deployed position and receives a load applied from rear to front of the vehicle, the movable part presses the second member to drive the first member to rotate toward the front of the vehicle.

In an embodiment of the disclosure, a rotation direction of the first member along the first axis is the same as a rotation direction of the second member along the second axis.

In an embodiment of the disclosure, the fixed part is provided with a guiding surface facing the cover member, and when the first member rotates along the first axis, the first member moves along the guiding surface.

Referring to FIG. 1A and FIG. 1B, in this embodiment, the movable spoiler device 100 is adapted to be installed on the body 52 of the vehicle 50 as an exterior component, so as to stabilize the airflow flowing through the vehicle 50, thereby improving the aerodynamic performance. The movable spoiler device 100 is, for example, a long and narrow structure extending along the left-right direction Y (e.g., as shown in FIG. 3A and FIG. 3B), which is the second direction of the vehicle 50, across the left and right sides of the vehicle 50, and disposed on the rear bumper 54 at the rear end of the body 52. Furthermore, as in the state shown in FIG. 1A and FIG. 1B, the movable spoiler device 100 may move in the front-rear direction X of the vehicle 50, such as moving between a storage position P1 connected to the rear bumper 54 and a deployed position P2 protruding from the rear bumper 54 toward the rear (i.e., the direction opposite to the direction indicated by the arrow in the front-rear direction X) of the vehicle 50. However, in other embodiments not shown, the movable spoiler device 100 may be disposed on other parts of the body 52 of the vehicle 50, and the disclosure does not limit the application of the movable spoiler device 100 on the vehicle 50, which may be adjusted according to requirements.

Specifically, in this embodiment, as shown in FIG. 1A to FIG. 3B, the movable spoiler device 100 includes a fixed part 110, a movable part 120, an actuator 130, and a cover member 140. The fixed part 110 is fixed to the body 52 of the vehicle 50 (e.g., fixed to the rear bumper 54 shown in FIG. 1A and FIG. 1B). The movable part 120 is configured to be movable between a storage position P1 connected to the fixed part 110 and a deployed position P2 protruding from the fixed part 110 toward the rear (i.e., the direction opposite to the direction indicated by the arrow in the front-rear direction X) of the vehicle 50. The actuator 130 is disposed on the fixed part 110 and drives the movable part 120 to move in the front-rear direction X of the vehicle. The cover member 140 is disposed on the fixed part 110 and connected to the movable part 120 so as to be linked with the movable part 120. Moreover, the movable spoiler device 100 further includes a link mechanism 150 disposed between the fixed part 110 and the movable part 120 and connected to the actuator 130 so as to be linked with the fixed part 110 and the movable part 120. In this way, the movable part 120 moves relative to the fixed part 110 in the front-rear direction X of the vehicle 50 through the driving of the actuator 130 and the driving of the link mechanism 150, that is, it moves between the storage position P1 and the deployed position P2. At the same time, the cover member 140 is also moved in conjunction with the movable part 120.

As an example, in this embodiment, the fixed part 110 and the movable part 120 are each formed into a plate-like structure (not limited to a single plate, but also a combination of multiple plates) and connected to each other. The link mechanism 150 is disposed between the fixed part 110 and the movable part 120, and is driven by the actuator 130 to contract or expand between the fixed part 110 and the movable part 120, thereby driving the movable part 120 to move in the front-rear direction X of the vehicle 50 relative to the fixed part 110. The specific structure and connection manner of the actuator 130 and the link mechanism 150 may be adjusted according to requirements, and the disclosure is not limited thereto.

The storage position P1 corresponds to the position shown in FIG. 1A, FIG. 2A, and FIG. 3A, the movable part 120 located at the storage position P1 is configured to be connected to the fixed part 110, and there is a relative distance D1 (as shown in FIG. 2A) between the outer ends of the fixed part 110 and the movable part 120. Correspondingly, the deployed position P2 corresponds to the position shown in FIG. 1B, FIG. 2B, and FIG. 3B, the movable part 120 located at the deployed position P2 is configured to move further to the rear relative to the fixed part 110, and there is a relative distance D2 (as shown in FIG. 2B) between the outer ends of the fixed part 110 and the movable part 120.

It may be seen that, in this embodiment, the movable part 120 located at the deployed position P2 is further to the rear than the movable part 120 located at the storage position P1, so that the relative distance D2 when the movable part 120 is located at the deployed position P2 is greater than the relative distance D1 when the movable part 120 is located at the storage position P1. Therefore, the movable spoiler device 100 may adjust the position of the movable part 120 relative to the fixed part 110 through the driving of the actuator 130 according to the requirement, so as to adjust the airflow flowing through the vehicle 50 and improve the aerodynamic performance according to the requirement. However, the disclosure does not limit the relative distances D1 and D2 between the movable part 120 and the fixed part 110 at the storage position P1 and the deployed position P2, which may be adjusted according to requirements.

Furthermore, as shown in FIG. 2A and FIG. 2B, in this embodiment, there is a gap G between the movable part 120 and the fixed part 110 due to the movement of the movable part 120. In detail, the gap G refers to the gap between the front end 122 (i.e., the direction indicated by the arrow corresponding to the front-rear direction X, i.e., the front end) of the movable part 120 and the rear end 112 (i.e., the direction opposite to the direction indicated by the arrow corresponding to the front-rear direction X, i.e., the rear end) of the fixed part 110. When the movable part 120 is located at the storage position P1, the front end 122 of the movable part 120 covers the rear end 112 of the fixed part 110 (as shown in FIG. 2A) without a gap G. Correspondingly, when the movable part 120 moves toward the rear of the vehicle 50 in the front-rear direction X relative to the fixed part 110 and is located at the deployed position P2, the front end 122 of the movable part 120 moves toward the rear away from the rear end 112 of the fixed part 110 (as shown in FIG. 2B), forming a gap G.

In view of this, in this embodiment, the movable spoiler device 100 is provided with a cover member 140, one end (e.g., the direction indicated by the arrow corresponding to the up-down direction Z of the vehicle 50, i.e., the upper end) of the cover member 140 is disposed on the fixed part 110, and another end (e.g., the direction opposite to the direction indicated by the arrow corresponding to the up-down direction Z of the vehicle 50, i.e., the lower end) of the cover member 140 is connected to the movable part 120. Furthermore, the another end of the cover member 140 is connected to the front end 122 of the movable part 120. Therefore, when the movable part 120 moves from the storage position P1 to the deployed position P2, the cover member 140 is driven by the movable part 120 to move and cover the gap G (as shown in FIG. 2B).

Thus, as an example, when the movable part 120 is located at the storage position P1 shown in FIG. 2A relative to the fixed part 110, through the driving of the actuator 130 and the driving of the link mechanism 150 (the specific means are not limited), the movable part 120 moves toward the rear of the vehicle 50 in the front-rear direction X relative to the fixed part 110 to the deployed position P2 as shown in FIG. 2B, and substantially simultaneously drives the cover member 140 to move toward the rear in the front-rear direction X. In this way, during the movement of the movable part 120 from the storage position P1 to the deployed position P2, the gap G gradually formed between the front end 122 of the movable part 120 and the rear end 112 of the fixed part 110 is synchronously covered by the cover member 140 connected to the front end 122 of the movable part 120, so as not to be exposed during the movement of the movable part 120.

Correspondingly, when the movable part 120 is located at the deployed position P2 shown in FIG. 2B relative to the fixed part 110, through the driving of the actuator 130 and the driving of the link mechanism 150 (the specific means are not limited), the movable part 120 moves toward the front of the vehicle 50 in the front-rear direction X relative to the fixed part 110 to the storage position P1 as shown in FIG. 2A, and substantially simultaneously drives the cover member 140 to move toward the front in the front-rear direction X. In this way, during the movement of the movable part 120 from the deployed position P2 to the storage position P1, the gap G between the front end 122 of the movable part 120 and the rear end 112 of the fixed part 110 gradually disappears, therefore, the cover member 140 configured to cover the gap G may also be accommodated inside the fixed part 110 without affecting the movement of the movable part 120.

It may be seen that, in the movable spoiler device 100, the cover member 140 is disposed on the fixed part 100, and is connected to the movable part 120 so as to be linked with the movable part 120. There is a gap G between the movable part 120 and the fixed part 110 due to the movement of the movable part, when the movable part 120 moves from the storage position P1 to the deployed position P2, the cover member 140 is driven by the movable part 120 to move and cover the gap G. In this way, even if there is a gap G due to the movement of the movable part 120 while the movable part 120 is moving in the front-rear direction X of the vehicle 50 relative to the fixed part 110 through the drive of the actuator 130, the gap G may be adaptively covered by the cover member 140 during the movement, thereby preventing the gap G from being exposed throughout the movement of the movable part 120. Accordingly, the movable spoiler device 100 may prevent the intrusion of foreign matter and improve the aerodynamic performance.

Furthermore, in this embodiment, as shown in FIG. 2A to FIG. 3B, the cover member 140 includes a first member 142 and a second member 144. The first member 142 and the second member 144 are, for example, long and narrow plates extending in the left-right direction of the vehicle 50, which may be a plate structure with a complete surface (e.g., the second member 144), or a frame structure (e.g., the first member 142) with openings on the surface according to requirements, the disclosure is not limited thereto. The first member 142 is rotatably connected to the fixed part 110 (e.g., connected to the base 160 provided on the fixed part 110) with a first axis A1 extending in the left-right direction Y of the vehicle 50. The second member 144 is rotatably connected to the first member 142 with a second axis A2 extending in the left-right direction Y, and is rotatably connected to the lower surface of the movable part 120 (e.g., connected to the lower surface of the front end 122 of the movable part 120) with a third axis A3 extending in the left-right direction Y. When the movable part 120 is located at the storage position P1, the first member 142 and the second member 144 are stored at the inner side of the fixed part 110 (as shown in FIG. 2A), and when the movable part 120 is located at the deployed position P2, the second member 144 covers the gap G (as shown in FIG. 2B).

Furthermore, in this embodiment, as shown in FIG. 2A to FIG. 3B, the first member 142 includes a first end E1 and a second end E2. The first end E1 is connected to the fixed part 110 in a rotatable manner about the first axis A1, and the second end E2 is connected to the second member 144 in a rotatable manner about the second axis A2. Furthermore, the second member 144 includes a third end E3 and a fourth end E4. The third end E3 is connected to the second end E2 of the first member 142 in a rotatable manner about the second axis A2, and the fourth end E4 is connected to the lower surface of the movable part 120 in a rotatable manner about the third axis A3. Moreover, as shown in FIG. 2A and FIG. 2B, the fixed part 110 is provided with a guiding surface 114 facing the cover member 140, and when the first member 142 rotates along the first axis A1, the first member 142 moves along the guiding surface 114.

In this way, as an example, when the movable part 120 is located at the storage position P1 shown in FIG. 3A relative to the fixed part 110, the movable part 120 moving toward the rear to the deployed position P2 drives the fourth end E4 of the second member 144 to rotate counterclockwise with the third axis A3 as the axis and move toward the rear. The third end E3 of the second member 144 drives the second end E2 of the first member 142 to rotate counterclockwise relative to the second member 144 with the second axis A2 as the axis and move toward the rear, so that the first end E1 of the first member 142 rotates counterclockwise with the first axis A1 as the axis. The rotation direction of the first member 142 along the first axis A1 is the same as the rotation direction of the second member 144 along the second axis A2 (e.g., they both rotate counterclockwise), and during this process, the second end E2 of the first member 142 moves along the guiding surface 114. Thus, the first member 142 and the second member 144 expand from each other, so that the second member 144 covers the gap G, and preferably the second member 144 covering the gap G in the deployed position P2 is coplanar with the movable part 120, that is, at this time, the outer surface of the second member 144 and the outer surface of the movable part 120 form the same plane (as shown in FIG. 2B).

Correspondingly, when the movable part 120 is located at the deployed position P2 shown in FIG. 3B relative to the fixed part 110, the movable part 120 moving toward the front to the storage position P1 drives the fourth end E4 of the second member 144 to rotate clockwise with the third axis A3 as the axis and move toward the front. The third end E3 of the second member 144 drives the second end E2 of the first member 142 to rotate clockwise relative to the second member 144 with the second axis A2 as the axis and move toward the front, so that the first end E1 of the first member 142 rotates clockwise with the first axis A1 as the axis. The rotation direction of the first member 142 along the first axis A1 is the same as the rotation direction of the second member 144 along the second axis A2 (e.g., they both rotate clockwise), and during this process, the second end E2 of the first member 142 moves along the guiding surface 114. Thus, the first member 142 and the second member 144 contract with each other, so that the first member 142 and the second member 144 do not affect the movement of the movable part 120.

It may be seen that, in this embodiment, the cover member 140 includes the first member 142 and the second member 144 and is configured in two stages, so as to be able to contract or expand in response to the movement of the movable part 120. In this way, compared with using a single plate, the present embodiment uses the first member 142 and the second member 144 supported by pivot axes to form the cover member 140, so that the movement of the cover member 140 may be smoother, and the gap G generated by the movement of the movable part 120 may be filled more appropriately. In addition, the guiding surface 114 corresponding to the moving path of the cover member 140 is disposed on the inner side of the fixed part 110, so that the cover member 140 may move more smoothly. However, the disclosure does not limit the rotation direction of the first member 142, the second member 144, etc., nor does it limit whether the guiding surface 114 is provided or not, which may be adjusted according to requirements.

In addition, in this embodiment, although it is assumed that when the movable part 120 is driven by the actuator 130 to move, the movement of the cover member 140 is linked to the movement of the movable part 120 in the manner described above, it is also assumed that when the movable part 120 is not driven by the actuator 130 but moves due to the application of an external load, the movement of the movable part 120 is also be linked to the movement of the cover member 140. In this case, since the first member 142 and the second member 144 are pivotally supported to freely rotate, when the movable part 120 is located at the deployed position P2 and receives a load from the rear of the vehicle 50 toward the front, the movable part 120 presses the second member 144 to drive the first member 142 to rotate toward the front of the vehicle 50. Therefore, the cover member 140 configured as above is not damaged by the application of external load, and the guiding surface 114 of the fixed part 110 may also effectively guide the movement of the cover member 140 when pushed by the external load. However, in other embodiments not shown, a single plate with a specific shape may also be adopted as the cover member 140, and the disclosure does not limit the specific structure (shape, number of assembled parts, etc.) of the cover member 140, which may be adjusted according to requirements. In addition, in this embodiment, as shown in FIG. 4 and FIG. 5, the second end E2 of the first member 142 of the cover member 140 is provided with a first axis hole O1 and a first slot S1 linked with the first axis hole O1, and the third end E3 of the second member 144 is provided with a first protruding column C1 capable of fitting into the first axis hole O1 through the first slot S1. The width W1 of the first slot S1 is less than the diameter D of the first axis hole O1, the length L of the long diameter side of the first protruding column C1 is between the width W1 of the first slot S1 and the diameter D of the first axis hole O1, and the width W2 of the short diameter side of the first protruding column C1 is less than the width W1 of the first slot S1.

In this way, the width W2 of the short diameter side of the first protruding column C1 is less than the length L of the long diameter side, so the first protruding column C1 may enter the first axis hole O1 through the first slot S1 with the short diameter side, and the part other than the short diameter side (e.g., the long diameter side) corresponds to the position of the first slot S1 through rotation (e.g., the short diameter side of the first protruding column C1 avoids the first slot S1). Thus, the second end E2 is connected to the third end E3 in a rotatable manner about the second axis A2 through the combination of the first axis hole O1 and the first protruding column C1, and it is easy to assemble through the first slot S1. Moreover, when the second member 144 rotates relative to the first member 142 with the second axis A2 as the axis, the first protruding column C1 does not fall off from the first axis hole O1 and the first slot S1. However, the disclosure does not limit the relative relationship between the first axis hole O1, the first slot S1, and the first protruding column C1, nor does it limit the specific means for the second member 144 to rotate relative to the first member 142 with the second axis A2 as the axis, which may be adjusted according to requirements.

Similarly, in this embodiment, as shown in FIG. 4, the fourth end E4 of the second member 144 of the cover member 140 is provided with a second axis hole O2 and a second slot S2 linked with the second axis hole O2, and the lower surface of the front end 122 of the movable part 120 is provided with a second protruding column C2 capable of fitting into the second axis hole O2 through the second slot S2. The second axis hole O2, the second slot S2, and the second protruding column C2 also have the same relative relationship as the aforementioned first axis hole O1, the first slot S1, and the first protruding column C1. Thus, the fourth end E4 is connected to the front end 122 of the movable part 120 in a rotatable manner about the third axis A3 through the combination of the second axis hole O2 and the second protruding column C2, and it is easy to assemble through the second slot S2. Moreover, when the second member 144 rotates relative to the movable part 120 with the third axis A3 as the axis, the second protruding column C2 does not fall off from the second axis hole O2 and the second slot S2. However, the disclosure does not limit the relative relationship between the second axis hole O2, the second slot S2, and the second protruding column C2, nor does it limit the specific means for the second member 144 to rotate relative to the movable part 120 with the third axis A3 as the axis, which may be adjusted according to requirements.

To sum up, in the movable spoiler device of the disclosure, the cover member is disposed on the fixed part, and is connected to the movable part so as to be linked with the movable part. There is a gap between the movable part and the fixed part due to the movement of the movable part, when the movable part moves from the storage position to the deployed position, the cover member is driven by the movable part to move and cover the gap. Preferably, the cover member includes a first member rotatably connected to the fixed part at a first axis, and a second member rotatably connected to the first member at the second axis and rotatably connected to the lower surface of the movable part at the third axis, so that the movement of the cover member is smoother. In this way, even if there is a gap due to the movement of the movable part while the movable part is moving in the front-rear direction of the vehicle relative to the fixed part through the drive of the actuator, the gap may be adaptively covered by the cover member during the movement, thereby preventing the gap from being exposed throughout the movement of the movable part. Accordingly, the movable spoiler device of the disclosure may prevent the intrusion of foreign matter and improve the aerodynamic performance.

Finally, it should be noted that the foregoing embodiments are only used to illustrate the technical solutions of the disclosure, but not to limit the disclosure; although the disclosure has been described in detail with reference to the foregoing embodiments, persons of ordinary skill in the art should understand that the technical solutions described in the foregoing embodiments may still be modified, or parts or all of the technical features thereof may be equivalently replaced; however, these modifications or substitutions do not deviate the essence of the corresponding technical solutions from the scope of the technical solutions of the embodiments of the disclosure.

What is claimed is:

1. A movable spoiler device, comprising:
    a fixed part, fixed on a body of a vehicle;
    a movable part, configured to be movable between a storage position connected to the fixed part and a deployed position protruding from the fixed part toward rear of the vehicle;
    an actuator, disposed on the fixed part and driving the movable part to move in a front-rear direction of the vehicle; and
    a cover member, disposed on the fixed part and connected to the movable part so as to be linked with the movable part, wherein,
    there is a gap between the movable part and the fixed part due to the movement of the movable part,
    when the movable part moves from the storage position to the deployed position, the cover member is driven by the movable part to move and cover the gap.

2. The movable spoiler device according to claim 1, wherein
    the cover member comprises a first member and a second member,
    the first member is rotatably connected to the fixed part with a first axis extending in a left-right direction of the vehicle,
    the second member is rotatably connected to the first member with a second axis extending in the left-right direction of the vehicle, and is rotatably connected to a lower surface of the movable part with a third axis extending in the left-right direction.

3. The movable spoiler device according to claim 2, wherein
    when the movable part is located at the storage position, the first member and the second member are stored at an inner side of the fixed part,
    when the movable part is located at the deployed position, the second member covers the gap.

4. The movable spoiler device according to claim 3, wherein
    the second member covering the gap in the deployed position is coplanar with the movable part.

5. The movable spoiler device according to claim 2, wherein
    the first member comprises a first end and a second end,
    the first end is connected to the fixed part in a rotatable manner about the first axis, and the second end is connected to the second member in a rotatable manner about the second axis.

6. The movable spoiler device according to claim 3, wherein
    the first member comprises a first end and a second end,
    the first end is connected to the fixed part in a rotatable manner about the first axis, and the second end is connected to the second member in a rotatable manner about the second axis.

7. The movable spoiler device according to claim 4, wherein
    the first member comprises a first end and a second end,
    the first end is connected to the fixed part in a rotatable manner about the first axis, and the second end is connected to the second member in a rotatable manner about the second axis.

8. The movable spoiler device according to claim 5, wherein
    the second member comprises a third end and a fourth end,
    the third end is connected to the second end of the first member in a rotatable manner about the second axis, and the fourth end is connected to the lower surface of the movable part in a rotatable manner about the third axis.

9. The movable spoiler device according to claim 6, wherein
    the second member comprises a third end and a fourth end,
    the third end is connected to the second end of the first member in a rotatable manner about the second axis, and the fourth end is connected to the lower surface of the movable part in a rotatable manner about the third axis.

10. The movable spoiler device according to claim 7, wherein
    the second member comprises a third end and a fourth end,
    the third end is connected to the second end of the first member in a rotatable manner about the second axis, and the fourth end is connected to the lower surface of the movable part in a rotatable manner about the third axis.

11. The movable spoiler device according to claim 2, wherein
when the movable part is located at the deployed position and receives a load applied from rear to front of the vehicle, the movable part presses the second member to drive the first member to rotate toward the front of the vehicle.

12. The movable spoiler device according to claim 3, wherein
when the movable part is located at the deployed position and receives a load applied from rear to front of the vehicle, the movable part presses the second member to drive the first member to rotate toward the front of the vehicle.

13. The movable spoiler device according to claim 4, wherein
when the movable part is located at the deployed position and receives a load applied from rear to front of the vehicle, the movable part presses the second member to drive the first member to rotate toward the front of the vehicle.

14. The movable spoiler device according to claim 2, wherein
a rotation direction of the first member along the first axis is the same as a rotation direction of the second member along the second axis.

15. The movable spoiler device according to claim 3, wherein
a rotation direction of the first member along the first axis is the same as a rotation direction of the second member along the second axis.

16. The movable spoiler device according to claim 4, wherein
a rotation direction of the first member along the first axis is the same as a rotation direction of the second member along the second axis.

17. The movable spoiler device according to claim 2, wherein
the fixed part is provided with a guiding surface facing the cover member, and when the first member rotates along the first axis, the first member moves along the guiding surface.

18. The movable spoiler device according to claim 3, wherein
the fixed part is provided with a guiding surface facing the cover member, and when the first member rotates along the first axis, the first member moves along the guiding surface.

19. The movable spoiler device according to claim 4, wherein
the fixed part is provided with a guiding surface facing the cover member, and when the first member rotates along the first axis, the first member moves along the guiding surface.

* * * * *